(12) United States Patent
Bastide et al.

(10) Patent No.: US 10,057,203 B2
(45) Date of Patent: Aug. 21, 2018

(54) MANAGING MESSAGES USING BATCH EDITS AND/OR ACTIONS

(71) Applicant: International Business Machines Corporation, Armonk, NY (US)

(72) Inventors: Paul R. Bastide, Boxford, MA (US); Matthew E. Broomhall, Goffstown, NH (US); Brenton P. Chasse, Plainville, CT (US); Thomas J. Evans, IV, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/886,805

(22) Filed: Oct. 19, 2015

(65) Prior Publication Data
US 2017/0111305 A1    Apr. 20, 2017

(51) Int. Cl.
*H04L 12/58*    (2006.01)

(52) U.S. Cl.
CPC .............. *H04L 51/22* (2013.01); *H04L 51/02* (2013.01); *H04L 51/16* (2013.01); *H04L 51/32* (2013.01)

(58) Field of Classification Search
CPC ...................................................... H04L 51/22
USPC ........................................................ 709/206
See application file for complete search history.

(56) References Cited

U.S. PATENT DOCUMENTS

| | | |
|---|---|---|
| 5,729,540 A | 3/1998 | Wegrzyn |
| 8,539,030 B2 | 9/2013 | Wang Baldonado et al. |
| 2012/0102114 A1* | 4/2012 | Dunn ..................... G06Q 10/10 709/204 |
| 2014/0229182 A1* | 8/2014 | Noble ................... G10L 13/027 704/270 |
| 2014/0304615 A1 | 10/2014 | Coe et al. |
| 2014/0379813 A1* | 12/2014 | Charania ................. H04L 51/02 709/206 |
| 2016/0212022 A1 | 7/2016 | Abou Mahmoud et al. |

OTHER PUBLICATIONS

Sanebox; "Your Email Without SaneBox," Downloaded from the Internet on Jul. 2, 2015, pp. 1-10 <http://www.sanebox.com/l/how-it-works#sthash.hEqocKRM.SmV6aodi.dpbs>.

Wikipedia; "Natural language processing," Downloaded from the Internet on Feb. 6, 2015, pp. 1-11 <http://en.wikipedia.org/wiki/Natural_language_processing>.

(Continued)

*Primary Examiner* — David Lazaro
*Assistant Examiner* — Zia Khurshid
(74) *Attorney, Agent, or Firm* — Charles L. Moore; Moore & Van Allen PLLC

(57) ABSTRACT

A method for managing messages may include detecting a need to manage a multiplicity of messages in an inbox of a user based on one of a predetermined criterion or a preset trigger or action. The method may also include analyzing a set of components of each message. The method may additionally include creating a plurality of batches of messages in response to detecting the need to manage the multiplicity of messages in the inbox of the user. Each batch may be based on the analysis of the set of components of each message. The method may further include performing a selected action on a chosen batch of messages.

17 Claims, 14 Drawing Sheets

(56) References Cited

OTHER PUBLICATIONS

Marketing Pilgrim; "Facebook Looks to Improve News Feed Content Quality," Downloaded from the Internet on Aug. 12, 2015, pp. 1-7, <http://www.marketingpilgrim.com/2013/08/facebook-looks-to-improve-news-feed-content . . . >.
Slashdot; "Facebook Launches Advanced AI Effort to Find Meaning in Your Posts," Downloaded from the Internet on Aug. 12, 2015, pp. 1-17, <http://tech.slashdot.org/story/13/09/21/1831239/facebook-launches-advanced-ai-effort-to-find-meanin>.
Wikipedia, "Deep Learning," Downloaded from the Internet on Feb. 6, 2015, pp. 1-16, <http://en.wikipedia.org/wiki/Deep_learning>.
SocialMediaToday; Understanding Facebook EdgeRank [Infographic], Downloaded from the Internet on Aug. 13, 2015, pp. 1-8, <http://www.socialmediatoday.com/content/understanding-facebook-edgerank-infographic>.
Sanebox, "Email Overload in the Enterprise: The science behind email productivity," Sanebox.com, No Publication date, pp. 1-8.
IBM Corporation; "IBM SPSS Statistics Editions," IBM Software Business Analytics, 2015, pp. 1-8.
IBM Corporation; "IBM SPSS Statistics: What's New," IBM Software Business Analytics, 2015, pp. 1-8.
IBM; "Swiftfile 4.2 for IBM Notes 9.0: Installation and Usage Instructions," 2013, pp. 1-3.
Wikipedia; "Regular expression," Downloaded from the Internet on Sep. 7, 2015, pp. 1-18 <http://en.wikipedia.org/wiki/Regular_expression>.
Wikipedia; "k-means clustering," Downloaded from the Internet on Oct. 19, 2015, pp. 1-9 <http://en.wikipedia.org/wiki/K-means_clustering>.
Lifehacker; "Batch Reply for Gmail Makes Replying to Email in Bulk Simple," Downloaded from the Internet Oct. 16, 2015, pp. 1-5; <http://lifehacker.com/5935297/batch-reply-for-gmail-makes-rep . . . >.
Tschabitscher, Heinz; "How to Filter Similar Messages in Gmail," Downloaded from the Internet Oct. 16, 2015, pp. 1-3; <http://email.about.com/od/gmailtips/qt/Filter_Similar_Messages_in_Gmail.htm>.
Addictive Tips; "Reply to Multiple Emails in Your Gmail Inbox at Once," Downloaded from the Internet Oct. 16, 2015, pp. 1-4; <http://www.addictivetips.com/web/batch-reply-for-gmail-chrome/>.

\* cited by examiner

MANAGING MESSAGES USING BATCH EDITS AND/OR ACTIONS

BACKGROUND

Aspects of the present invention relate to electronic communications, such as mail clients and online networks, and more particularly to a method, system and computer program product for managing messages using batch edits and/or actions.

Mail Clients and Online Networks are a universal mechanism to connect people and information in logical and organized ways, which enable sharing and processing of information between the users. The most common mechanisms of sharing and processing information are the inbox, wall, activity stream, timeline, or profile. These mechanisms enable a user to rapidly share information with others and gather information from others in the network. Each user of the network may create, read and respond to countless messages each day resulting in an overwhelming and congested inbox. There is a need to organize and conquer the inbox, reduce congestion and unclutter the inbox.

SUMMARY

According to an embodiment of the present invention, a method for managing messages may include detecting, by a processor, a need to manage a multiplicity of messages in an inbox of a user based on one of a predetermined criterion or a preset trigger or action. The method may also include analyzing, by the processor, a set of components of each message. The method may additionally include creating, by the processor, a plurality of batches of messages in response to detecting the need to manage the multiplicity of messages in the inbox of the user. Each batch may be based on the analysis of the set of components of each message. The method may further include performing, by the processor, a selected action on a chosen batch of messages.

According to another embodiment of the present invention, a system for managing messages may include a processor and a module operating on the processor for managing messages. The module may be configured to perform a set of functions that may include detecting a need to manage a multiplicity of messages in an inbox of a user based on one of a predetermined criterion or a preset trigger or action. The set of functions may also include analyzing a set of components of each message. The set of functions may additionally include creating a plurality of batches of messages in response to detecting the need to manage the multiplicity of messages in the inbox of the user. Each batch may be based on the analysis of the set of components of each message. The set of functions may further include performing a selected action on a chosen batch of messages.

According to another embodiment of the present invention, a computer program product for managing messages may include a computer readable storage medium having program instructions embodied therewith. The computer readable storage medium is not a transitory medium per se. The program instructions may be executable by a device to cause the device to perform a method that may include detecting a need to manage a multiplicity of messages in an inbox of a user based on one of a predetermined criterion or a preset trigger or action. The method may also include analyzing a set of components of each message. The method may additionally include creating a plurality of batches of messages in response to detecting the need to manage the multiplicity of messages in the inbox of the user. Each batch may be based on the analysis of the set of components of each message. The method may further include performing a selected action on a chosen batch of messages.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3B is an example of the batch GUI in FIG. 3A including a feature presenting a plurality of actions for selection by the user for performance on a chosen batch of messages.

FIGS. 5A and 5B are an example of a batch interface illustrating performance of a selected action of merging and selecting a subset of content from messages grouped in a chosen batch in the exemplary method of FIG. 4.

DETAILED DESCRIPTION

Figure 1A:
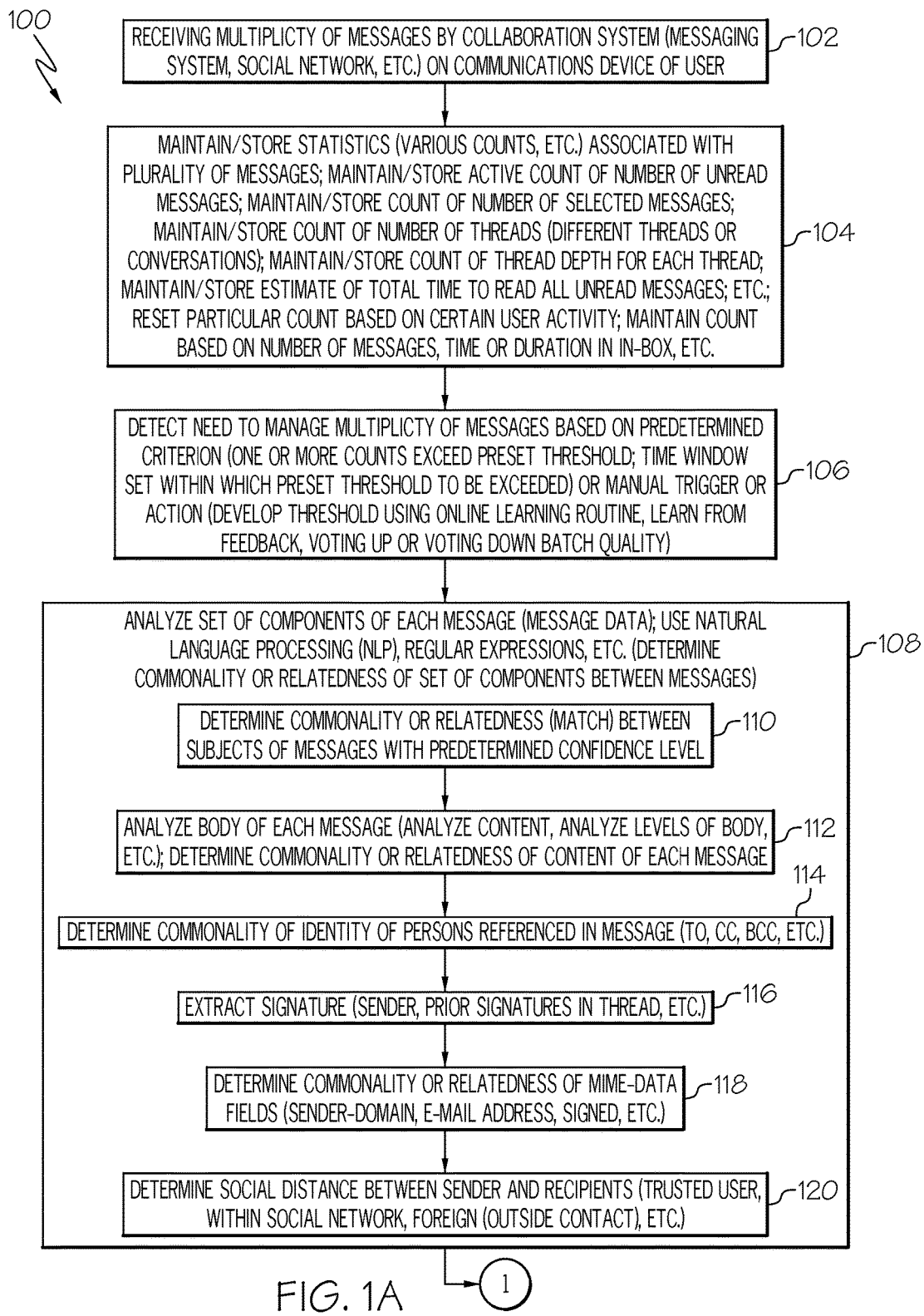
FIGS. 1A-1C are a flow chart of an example of a method for managing messages using batch edits and/or actions in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
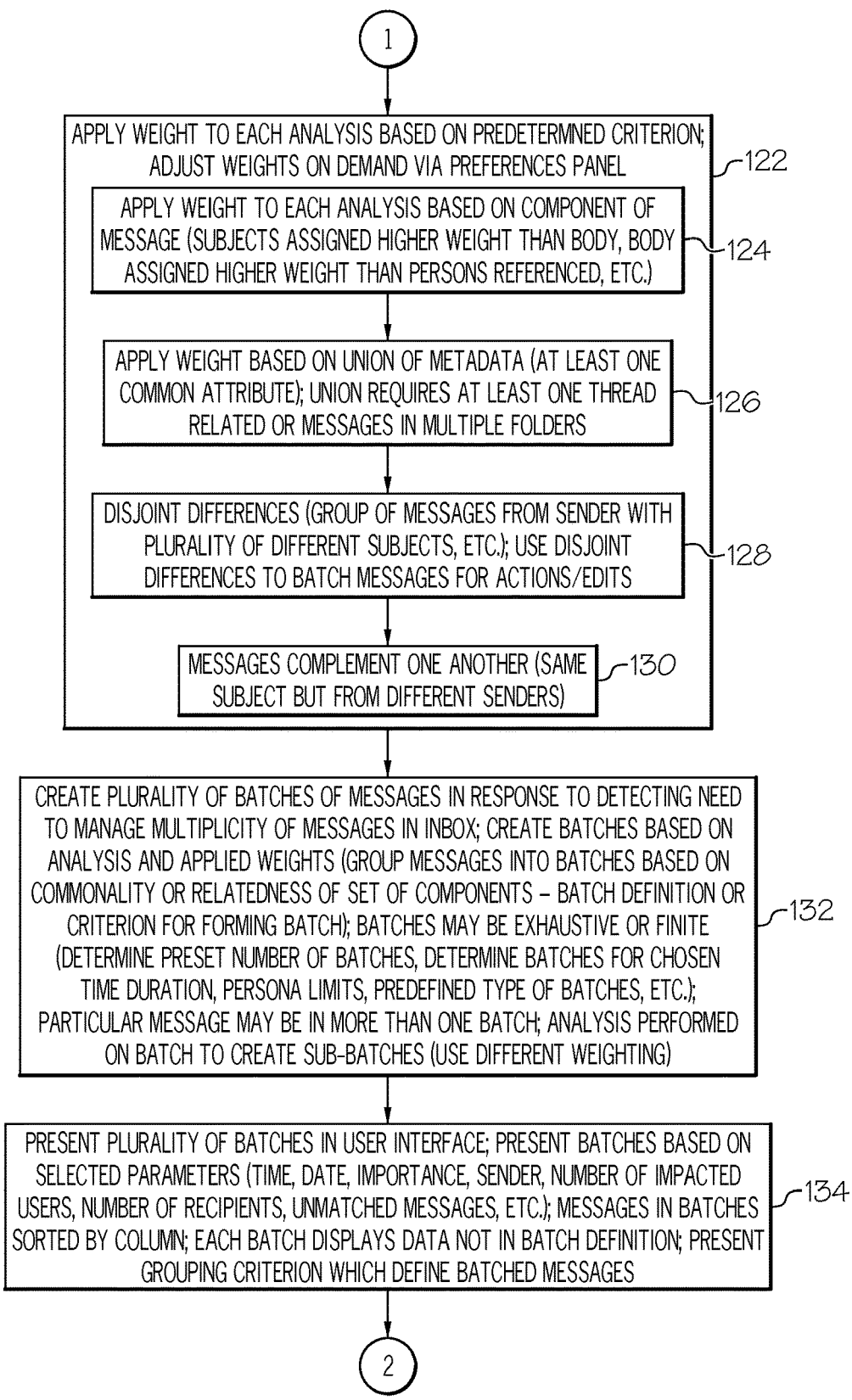
Figure 1C:
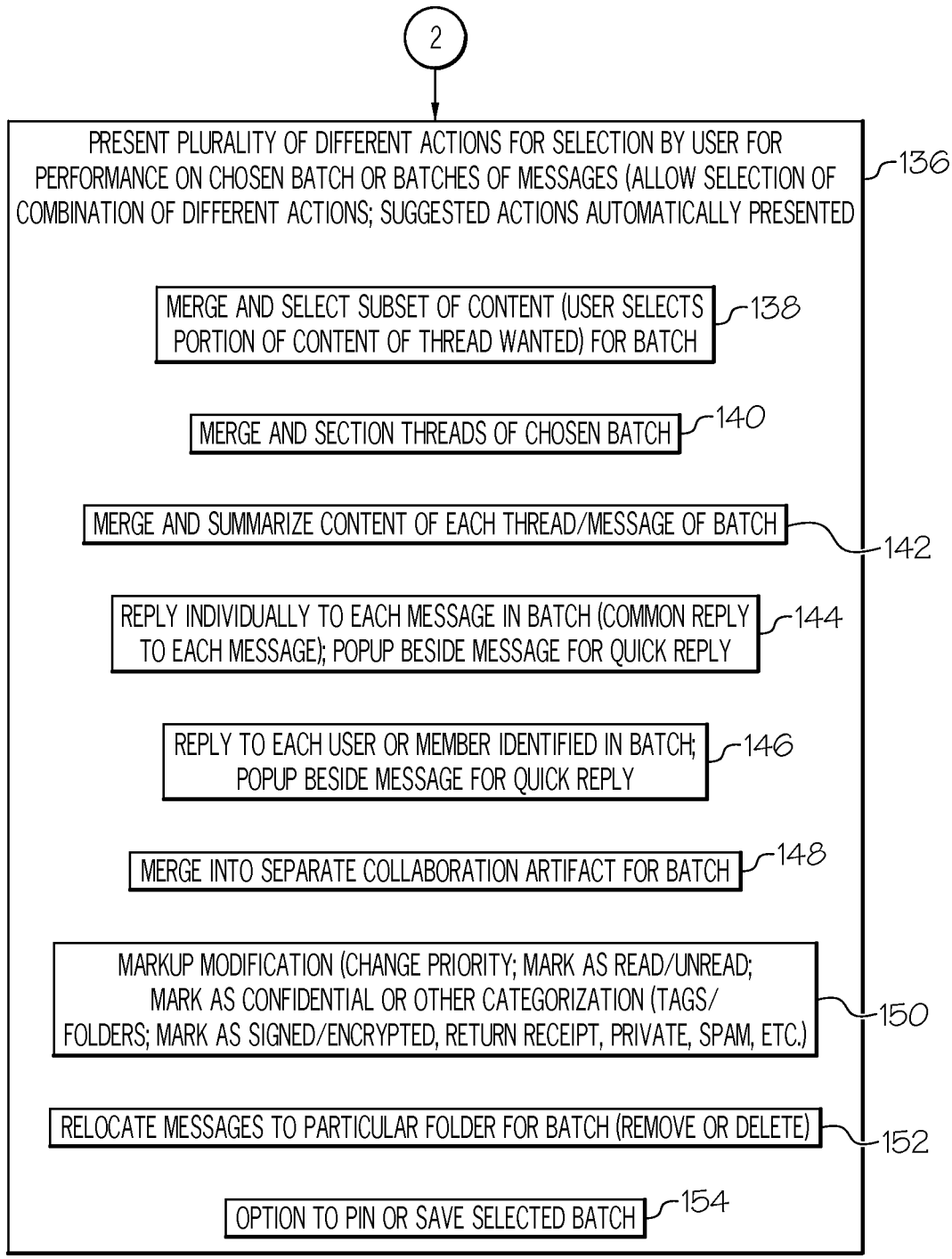

FIGS. 1A-1C are a flow chart of an example of a method 100 for managing messages using batch edits and/or actions in accordance with an embodiment of the present invention. In block 102, a multiplicity of messages may be received by a collaboration system on a communications device of a user. The collaboration system may be a messaging system, a social network or system or other electronic communications system or network, such as e-mail, instant messaging, chat or similar communications system or network. The social network or system may be an asynchronous network or a synchronous network. An example of an asynchronous network may be Twitter where a user may follow communications generated by another user or person. Twitter is a trademark of Twitter, Inc. in the United States, other countries or both. An example of a synchronous network is IBM Connections. IBM Connections is a trademark of International Business Machines Corporation in the United States, other countries or both. The collaboration system may include a collaboration application running on a communications device of a user, a collaboration module or program operating on a server or a combination of both. The user's communications device may be client computer system, mobile computer system or communications device, such as a smartphone or any other type communications device capable of performing the operations described herein.

In a block 104, statistics associated with the plurality of messages may be maintained and stored or recorded. Examples of statistics that may be maintained and stored may include, but is not necessarily limited to, a count of the number of unread messages, a count of the number of selected messages, a count of the number of threads or conversations, a count of the depth or number of messages associated with each thread or conversation, an estimate of a total time to read all unread messages, or other statistics associated with the plurality of messages. The count may also be an active count for a current or recent period of time. A particular count may be reset based on a certain user activity or other event. For example, the count may be maintained based on a number of messages in an inbox of the user, a time or duration a particular message, group of messages or thread has been in the inbox of the user, or the respective counts may be maintained based on another parameter or parameters associated with the messages. Different counters or mechanisms may be provided for keeping track of the number of unread messages, selected messages or read messages, threads, depth associated with each thread or other parameters. The estimated time period or duration to read all messages may be estimated based on a length and/or complexity of the messages using natural language processing, counting words in each message or other arrangement for estimating a time to read each message.

In block 106, a need to manage the multiplicity of messages in an inbox of a user may be detected based on a predetermined criterion or criteria. A preset trigger or action may also result in causing management of the multiplicity of messages similar to that described herein. Examples of the predetermined criterion or criteria or a preset trigger may include but is not necessarily limited to one or more counts exceeding a preset threshold. For example, the predetermined criterion for detecting the need to manage the multiplicity of messages or a trigger to initiate management of the multiplicity of messages may include at least one of a number of unread messages exceeding a first preset threshold, a number of selected messages exceeding a second preset threshold, a depth of a particular thread of messages in a conversation exceeding a third preset threshold, a number of conversation threads exceeding a fourth preset threshold, and/or an expected time to review a plurality of messages in an inbox exceeding a fifth preset threshold, and/or a preset window of time or time duration being exceeded. A time window may be set for a particular count, or for each count, within which the count may exceed the preset threshold to detect or trigger management of the multiplicity of messages. For example, the count or number of unread messages exceeding the preset threshold within a selected number of hours may trigger management of the multiplicity of messages as described herein. A threshold or different thresholds for different counts may be determined automatically or developed using an online learning tool, learning from feedback, or voting up or voting down batch quality. For example, a threshold may be set to 1000 messages. The method 100 or batch generator may detect that no batches have been generated over a predetermined time period or other criterion. The threshold may then be reduced a certain number of messages, for example, to a new threshold of 500 messages. A new batch may be created in response to detecting the new threshold being exceeded or 501 messages being in the inbox of the user.

Batch quality may refer to the grouping of messages into respective batches based on analysis of the messages and a degree or level of commonality or relatedness of messages grouped in a particular batch based on the analysis as described in more detail below. Voting up or voting down batch quality may involve modifying the importance of components or elements of the messages or analysis of the components of the messages that define the batch based on a quality of prior batches. If the batch quality is determined to be low or commonality or relatedness of the messages in low, the analysis of the components used to create the batch may be weighted less. Likewise, if the batch quality is good, the components or analysis of the components used to create the batch may be weighted higher. Different statistics or counts to be maintained and stored and corresponding preset thresholds may be defined and stored in a preferences panel. The preset thresholds may be determined automatically as described above and/or may be adjusted by the user. An example of a preferences panel will be described with reference to FIG. 2.

In block 108, a set of components of each message may be analyzed for use in grouping the messages in batches. A commonality or relatedness of between different components of the set of components of the multiplicity of messages may be determined based on the analysis of the set of components of each message. The analysis may include performing Natural Language Processing (NLP), Regular Expression processing or similar analysis on the set of components or each message. Commonality or relatedness between components may also be determined using k-means clustering such that a set number of batches may be created. Each batch of messages may correspond to a commonality or relatedness of one or more components of the set of components of the messages grouped in each batch. The set of components may be analyzed in response to detecting a need for managing the messages or a preset triggering event that causes management of the multiplicity of messages in the inbox of the user. In another embodiment each message may be analyzed when received by the communications device of the user. The commonality or relatedness of the set of components between the multiplicity of messages may include matching information or data associated with the different components of the multiplicity of messages based on a predetermined confidence level. Blocks 110-120 are examples of different operations or procedures that may be used to analyze the set of components of each message. The exemplary operations or procedures described with reference to blocks 110-120 are not exhaustive and any analysis may be performed that may be useful in grouping the messages in batches similar to that described herein. The messages may then be grouped into batches based on the commonality or relatedness between the components of the messages. Any or all of the analyses described with respect to blocks 110-120 may be used to group the messages into batches.

In block 110, commonality or relatedness between subjects of the multiplicity of messages may be determined. The commonality or relatedness between the subjects may include matching the subject of different messages with a predetermined confidence level. For example, subjects that have more words that overlap, i.e., are similar or identical, will have a higher confidence level than subjects that fewer or no words that are overlap. Messages may be grouped into batches according to matches between the subjects of the messages. A predetermined confidence level may be set or determined that subjects of messages that do not match exactly or word-for-word do have a certain percentage of similarity.

In block 112, a body of each message may be analyzed to determine a commonality or relatedness between messages. The content and levels of the body of each message may be analyzed. Levels of the body may refer to threading in a reply/forward/to message. A new first message has a history of no prior messages and no threads and may be considered a level 0. A reply to the new message results in a level 1 if the message includes the prior history of the new message. Accordingly, a level may be added to each reply/forward/to message that is sent and that includes the history or all prior messages on which the current message builds. Natural Language Processing (NLP), Regular Expression processing or similar analysis may be performed on each message to determine any commonality, relatedness or match based on the content or levels of the body of the message. Messages may be grouped together in batches based on the analysis of the body of each message and commonality or relatedness between the bodies of the messages. The grouping in batches may also include grouping based a predetermined confidence level that the contents have a certain degree of similarity.

In block 114, a commonality or relatedness of the identity of persons referenced in each message may be determined. For example an identity of each person in the TO, CC, and BCC fields of the message may be determined. An identity of persons referenced in the body or content of the message may also be identified. The messages may then be grouped into batches according to matches between the identity of persons referenced in the messages.

In block 116, a signature may be extracted from each message. For example a signature of the sender and/or prior signatures in a thread may be extracted. The signatures may be compared to determine similarities for grouping the messages and a particular batch of messages may be based on the signatures.

In block 118, commonality or relatedness of Multipurpose Internet Mail Extensions data (MIME-data) fields may be determined for grouping messages within a particular batch or batches. Examples of MIME-data that may be analyzed may include, but is not necessarily limited to, sender-domain information, e-mail address information, signature information, information about from where the message was sent or similar data that may be analyzed to determine any matches or similarities for grouping messages within a particular batch based on the analysis.

In block 120, a social distance between a sender and a recipient or recipients may be determined and used for grouping messages within a particular batch. Examples of determining the social distance may include determining whether the sender is a trusted user, whether the sender is within or a member of a particular social network or organization, and whether the sender is foreign or an outside connect.

In block 122, a weight may be applied to each analysis, results of each analysis, or each component of the set of components of each message based on a predetermined criterion or criteria for grouping the messages in a particular batch. The weights may be adjusted by the user on demand using a preferences panel. An example of a preferences panel will be described with reference to FIG. 2. Examples of applying different weights to the analysis or results of the analysis of different components of the messages will be described with reference to blocks 124-130. The examples described with respect to blocks 124-130 are non-exhaustive and other mechanisms or procedures for applying weights for grouping messages in particular batches based on commonality or relatedness or matching data based on a predetermined confidence level as described herein may also be applicable.

In block 124, a weight may be applied to each analysis based on the component of the message. For example, subjects or results of analysis of the subjects of the messages may be assigned at a higher weight than results analysis of the bodies of the messages for grouping messages into particular batches. Similarly, the results of analysis of the bodies of the messages may be assigned a higher weight than the results of analysis of persons referenced within the messages for grouping messages into particular batches.

In block 126, a weight may be applied based on a union of metadata or at least one common attribute in different messages. A union of metadata may involve at least one thread related or messages in multiple folders.

A particular weight may also be applied based on an intersection of metadata. For example, User A may support alpha product, and may receive hundreds of messages related to alpha product. User A has no idea why he has so many messages about alpha product. User A may grab the messages and selects the messages to perform batch edits and/or actions on the messages. The results of the analysis may be presented to User A and based on the results User A may observe a commonality between messages, e.g., common subjects, people, natural language similarities, common attachments (logos), signatures, screenshot attachments, overlapping signatures (titles, departments, locations). User A can now prioritize the actions he may need or want to take with respect to the messages. Each action taken may be independent of the set of messages. For example, User A may create a single response and may respond to each message independently with the single response.

In block 128, joint differences may be used to group messages in different batches. For example a group of messages from a sender with a plurality of different subjects may be used to group the messages in different batches for different actions or edits.

In block 130, messages that are complementary to one another may be grouped in a particular batch. For example, a set of messages received by a user may have the same subject may but may be from different senders. These messages may be grouped in a batch and a certain action or edit selected by the user may be performed on each of the messages in the batch.

In block 132, a plurality of batches of messages may be created in response to detecting the need to manage the multiplicity of messages in the inbox of the user or a preset trigger may cause management of the multiplicity of messages. For example, one of the counts that are being maintained may exceed its preset threshold.

A plurality of different batches may be created based on the results of the analysis of the set of components in block 108, or based on the results of the analysis and applied weights to the results of the analysis. The messages may be grouped into the different batches based on the commonality or relatedness between components of the set of components analyzed for each message. The commonality or relatedness may involve matching information or data associated with each component based on a preset confidence level or confidence levels. Different confidence levels may be set for each different component. A batch definition or grouping criterion or criteria for forming each batch may be defined. The batch definition or grouping criterion or criteria for each batch may correspond to the common or matching data or information from the analysis of the set of components or the common or matching data or information and the weight applied to the results of the analysis of the particular component. For example, the batch definition or grouping criterion for a particular batch may be all messages with the same or similar title. The batch definition or grouping criterion or criteria may correspond to the resulting data or information from the analysis of any of blocks 110-120 and any weights that may be applied to the results of the analysis in block 122 or blocks 124-130. Accordingly, a particular message may be grouped in more than one batch if the message satisfies the batch definition or grouping criterion for more than one batch.

The plurality of batches may be exhaustive or finite. A feature may be provided for creating a preset number of batches. The preset number of batches may be based on a specified list of components of the messages to be analyzed. In another embodiment, types of batches may be predefined based on the grouping criterion or batch definition and messages may be grouped in the particular type of batch in response to the message satisfying the grouping criterion or batch definition. In accordance with an embodiment, a chosen time duration may be set for creating batches to minimize the time to perform the analysis and create the batches. The number of messages in a batch may also be limited to a preset number. The preset number of the maximum number of messages that may be in a batch may be specified by the user in a preferences panel. Any messages that do not satisfy the batch definition or grouping criterion may be grouped in a default batch.

In accordance with an embodiment, a batch may be created based on any of the analyses in blocks 110-120 and then one or more different analyses in blocks 110-120 may be performed on the batch to create sub-batches. For example, a main batch of messages may be created based on matches between subjects and then sub-batches may be created based on analysis of the body of each message or analysis of the identity of persons referenced in the messages or other type analysis to form sub-batches.

In block 134, the plurality of batches of messages may be presented in a graphical user interface (GUI). The GUI permits the user to select any batch actions and to move through the different batches. The batches may be presented based on selected parameters. For example, the batches may be presented to the user based on a particular window of time, date, importance, identity of the sender, number of impacted users, number of recipients, or other selected parameter or parameters. Messages in batches may be sorted by column. The batches may only display column data that is not in the batch definition or grouping criterion. For example, if the batch is created based subject similarity or natural language similarity but the messages may be from different senders, the differences or components of the messages not used to create the batch or not part of the batch definition may be displayed in the column data to enable faster processing of the messages in the batch by the user. Accordingly, in the example above, displaying the different senders or "From" information in a column may enable faster processing of the batch. Grouping criterion, batch definition or rules which define the messages in each batch may also be presented.

Figure 3A:
FIG. 3A is an example of a batch graphical user interface (GUI) in accordance with an embodiment of the present invention.

Referring also to FIG. 3A, FIG. 3A is an example of a batch graphical user interface (GUI) 300 in accordance with an embodiment of the present invention. In accordance with an embodiment, a single batch 302 of messages may be presented in the batch GUI 300. Different batches of messages may be presented in the batch GUI 300 by using the arrow buttons 304a and 304b to move from one batch of messages to another. A batch identification 306 or name of the batch may be presented in the GUI at a predetermined location, for example, centered in a top portion of the GUI 300 as illustrated in the exemplary GUI 300 in FIG. 3A. The batch identification 306 or name of the batch 302 may correspond to the batch definition or grouping criterion for forming the batch 302. The user may edit the batch identification 306 or name.

The batch definition 308 or grouping criterion for forming the batch 302 may also be presented in the batch GUI 300 at a predetermined location, for example, centered in a bottom portion of the GUI 300 as illustrated in FIG. 3A.

Referring back to FIG. 1C, in block 136, a plurality of actions may be presented in the batch GUI for selection by the user for performance on a chosen batch of messages or chosen batches of messages. The batch GUI may allow selection of a combination of actions. A suggested action for performance on the chosen batch or batches may be automatically presented in the batch GUI. The plurality of actions for selection by the user may be presented in the batch GUI in response to a predetermined action by the user. For example, the user may select a feature or icon in the batch GUI for presenting the plurality of actions, the user may right click within the batch GUI, or perform some other action to cause the plurality of selectable actions to be presented in the batch GUI.

Figure 3B:
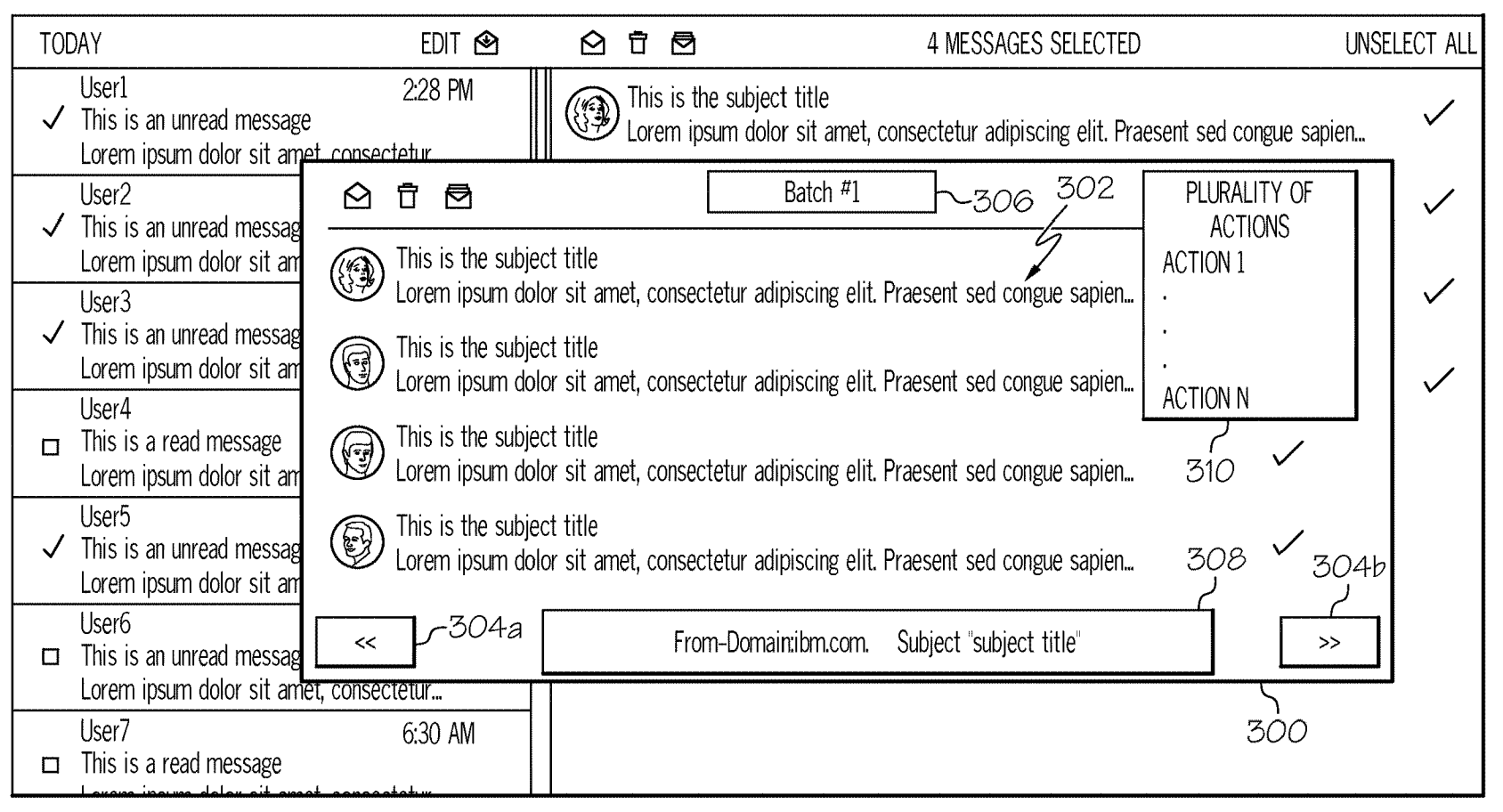

Referring also to FIG. 3B, FIG. 3B is an example of the batch GUI 300 in FIG. 3A including a feature 310 presenting a plurality of actions for selection by the user for performance on the chosen batch 302 of messages. The feature 310 presenting the plurality of actions for selection may be a dialogue box or other feature.

Examples of different actions that may be presented in batch GUI 300 for selection by the user will be described with reference to blocks 138-154 in FIG. 1C. The different exemplary actions represented in blocks 138-154 are non-exhaustive and any other actions that allow efficient batch disposition of multiple messages may also be used or presented for selection by the user.

In block 138, a merge and select subset action may be presented for selection by the user to perform on the messages in the chosen batch. An exemplary method for merging and selecting a subset for the chosen batch will be described with reference to FIG. 4.

In block 140, a merge and section threads of the chosen batch may be presented for selection by the user. An example of a method for merging and sectioning threads of a chosen batch will be described in more detail with reference to FIG. 6.

In block 142, another possible action for selection by the user may include merging and summarizing content of each thread or message of the chosen batch. An exemplary method for merging and summarizing content of each thread or message of a chosen batch will be described with reference to FIG. 7.

Figure 8:
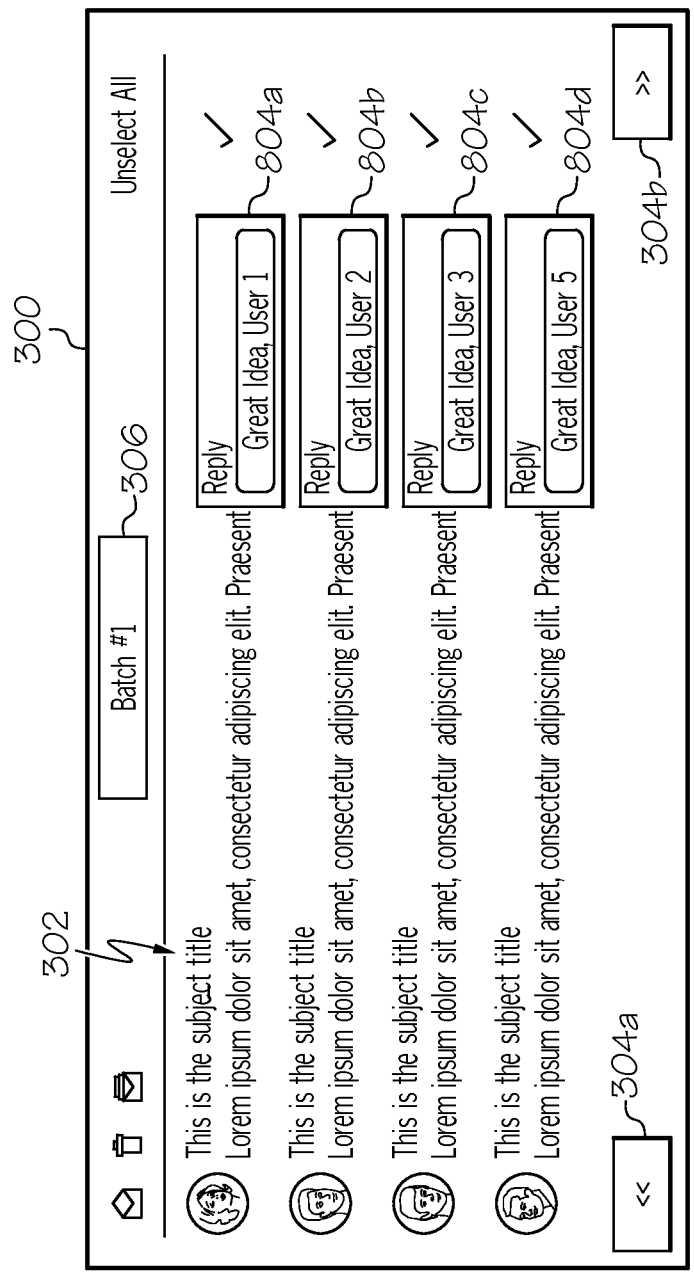
FIG. 8 is an example of a batch interface illustrating the selected action of replying to each user identified in a chosen batch of messages in accordance with an embodiment of the present invention.

In block 144, an action to reply individually to each message in the chosen batch may be presented for selection by the user. A common reply may be created for responding to each message. In another example, a feature may be presented for creating an individual reply to each message. A pop-up window or other feature may be presented beside each message in the batch for creating a quick reply to each message. Referring also to FIG. 8, FIG. 8 is an example of the batch interface 300 illustrating the selected action of replying to each user or message identified in the chosen batch 302 of messages in accordance with an embodiment of the present invention. A pop-up window 804a-804d may be respectively associated with each message in the batch 302 for entering a short reply individually to the sender of each message in the batch 302. The pop-up windows 804a-804b may be automatically populated or filled based on the user's draft reply to one of the senders for efficient disposition of the group of message in the batch 302. Each reply may also be automatically personalized based on the analysis of each message previously performed for grouping the messages into batches during which an identity of each sender may be determined. The user may also edit each of the replies in the pop-up windows 804a-804d before sending the replies.

Referring back to FIG. 1C, in block 146, an action to reply to each user or member identified in the chosen batch may be presented for selection by the user. A feature, such as a pop-up window or other mechanism, may be presented in association with each message or identified user, similar to that illustrated in FIG. 8, for creating a short reply by the user to the identified user or recipient in each pop-up window.

In block 148, an action to merge the batch of messages in the chosen batch into a separate collaboration artifact may be presented for selection by the user. Users and contents may be extracted from selected messages of the chosen batch. A new Wiki, activity or other collaboration artifact may be created based on the extracted users and contents.

In block 150, an action for markup modification of the messages in the chosen batch may be presented for selection by the user. Different markups or modifications can be made to a reply to the group of messages in the batch. For example, markups can be made to metadata, such as priority changes, mark as read or unread, mark as confidential or some other categorization, tag certain messages or place in a folder, mark as signed or encrypted, mark as spam or other markup or modification.

In block 152, an action for relocation of selected messages to a particular folder may be presented for selection by the user. For example selected messages may be selected to be deleted or trashed or moved to a particular identified folder.

In block 154, an option to pin or save a selected batch may be presented for selection by the user. As an example, a user may determine that one of the batches is highly relevant to them and the user wants to pin or save the batch so that as new messages arrive, the messages can be analyzed based on the batch definition or grouping criterion for forming the batch to determine if the new messages should be automatically added to the batch. Examples of batches of messages that the user may want to pin or save may include but is not necessarily limited to daily system status reports sent from multiple domains, messages from a particular sender, messages from a particular sender with similar but non-identical subjects, etc. An example of a method for pinning and saving a particular batch selected by the user will be described with reference to FIG. 9.

Figure 2:
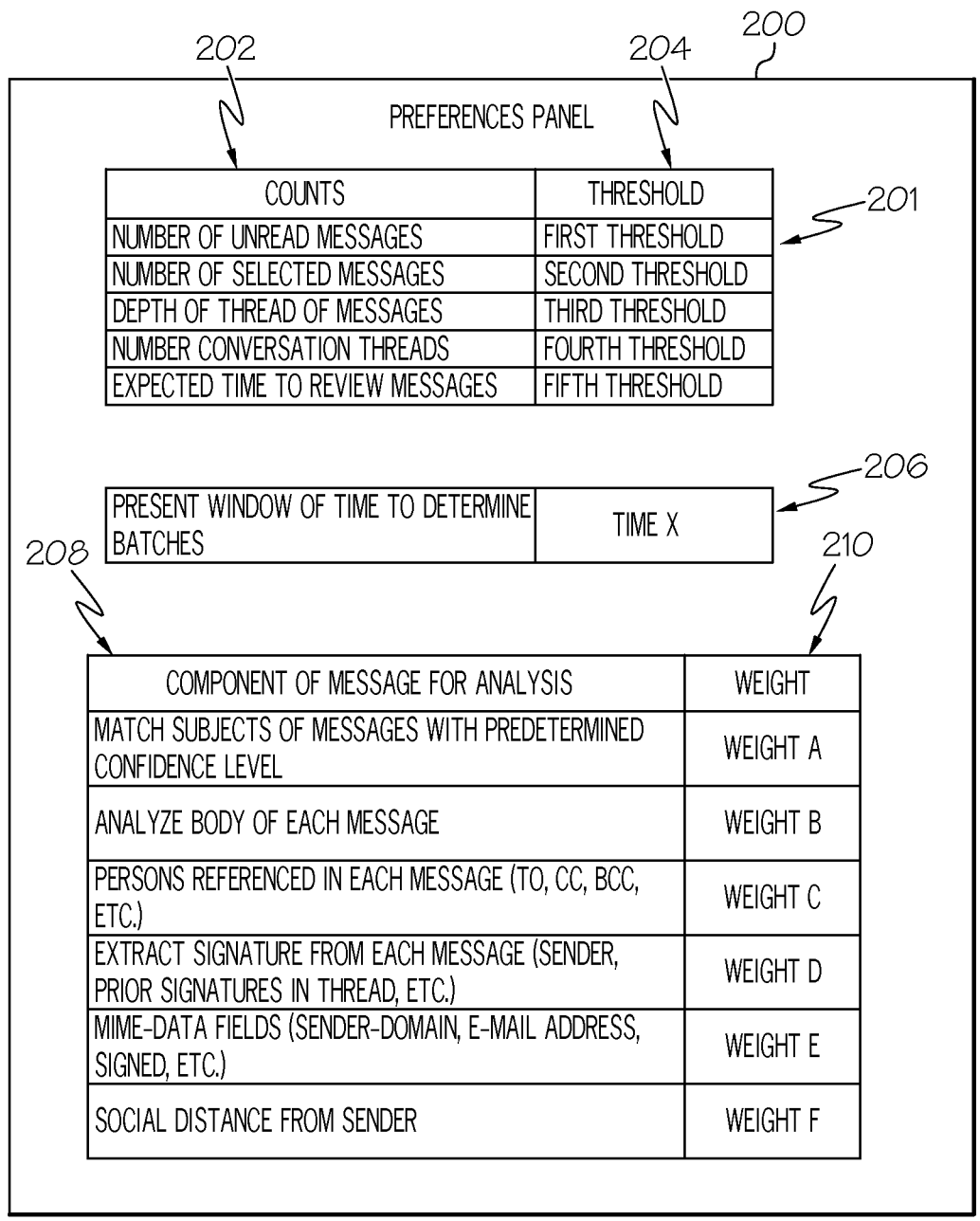
FIG. 2 is an example of a preferences panel for managing messages using batch edits and/or actions in accordance with an embodiment of the present invention.

FIG. 2 is an example of a preferences panel 200 for managing messages using batch edits and/or actions in accordance with an embodiment of the present invention. The preferences panel 200 may be a graphical user interface (GUI) including features or fields for specifying different parameters for managing messages using batch edits and/or actions similar to that described herein. For example, the preferences panel 200 may include a first section 201 for defining a plurality of counts 202 that may be maintained and stored for managing messages in an inbox of a user. A threshold 204 may be preset for each count. Examples of counts may include but is not necessarily limited to a number of on read messages, a number of selected messages, a depth of a thread of messages, a number of conversation threads, and an expected time to review messages in the inbox. As previously described, detecting a need for management of the messages may be determined by the preset threshold of one or more of the counts being exceeded. In other works, management of the messages in a user's inbox as described herein may be triggered in response to the preset threshold of one or more of the counts being exceeded.

The preferences panel 200 may also include a second section 206 for defining a window of time or time duration for determining batches for grouping messages. The predetermined window of time or time limit insures that the batches are formed and the messages grouped into the different batches efficiently and with the minimal time specified by the user. Any messages not grouped in a particular batch may be grouped in a default batch.

The preferences panel 200 may also include a third section 208 for defining components for analysis in each message for grouping the messages in the batches based on the analysis as previously described. A weight 210 may also be associated with the results of each analysis or component for grouping the messages in the different batches. Similar to that previously described, examples of components of messages that may be analyzed for grouping the messages in batches may include, but is not necessarily limited to, matching subjects of messages with a predetermined competence level, analyzing a body of each message, identifying persons referenced in each message, extracting a signature from each message, extracting information from mime-data fields, and determine a social distance from the sender. Identifying persons referenced in each message may include extracting information from the TO, CC, and BCC fields of the message and/or an identity of any persons referenced in a body of the message. Extracting a signature from each message may include identifying the sender and determining prior signatures in a thread. Extracting data from mime-data fields may include determining sender-domain information, e-mail address information and signed information from each message.

Figure 4:
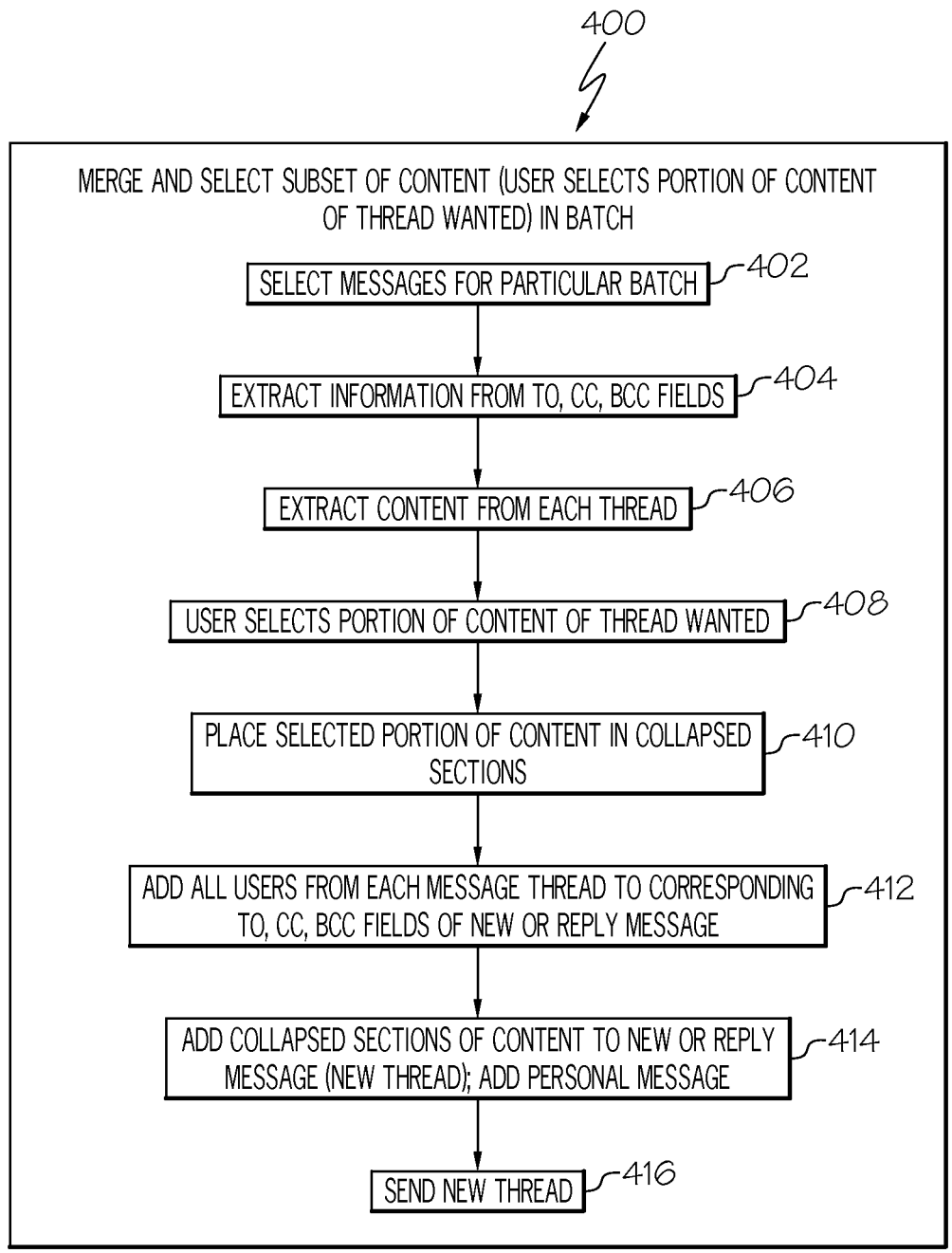
FIG. 4 is a flow chart of an example of a method for merging and selecting a subset of content in a chosen batch of messages in accordance with an embodiment of the present invention.

FIG. 4 is a flow chart of an example of a method 400 for merging and selecting a subset of content in a chosen batch in accordance with an embodiment of the present invention. The method 400 may be implemented in response to selection of the action in the batch GUI 300 associated with block 138 in FIG. 1C. Merging and sectioning threads may involve combining two or more independent conversations that may be combinable or that may need to be combined for some reason or purpose.

Figure 5A:
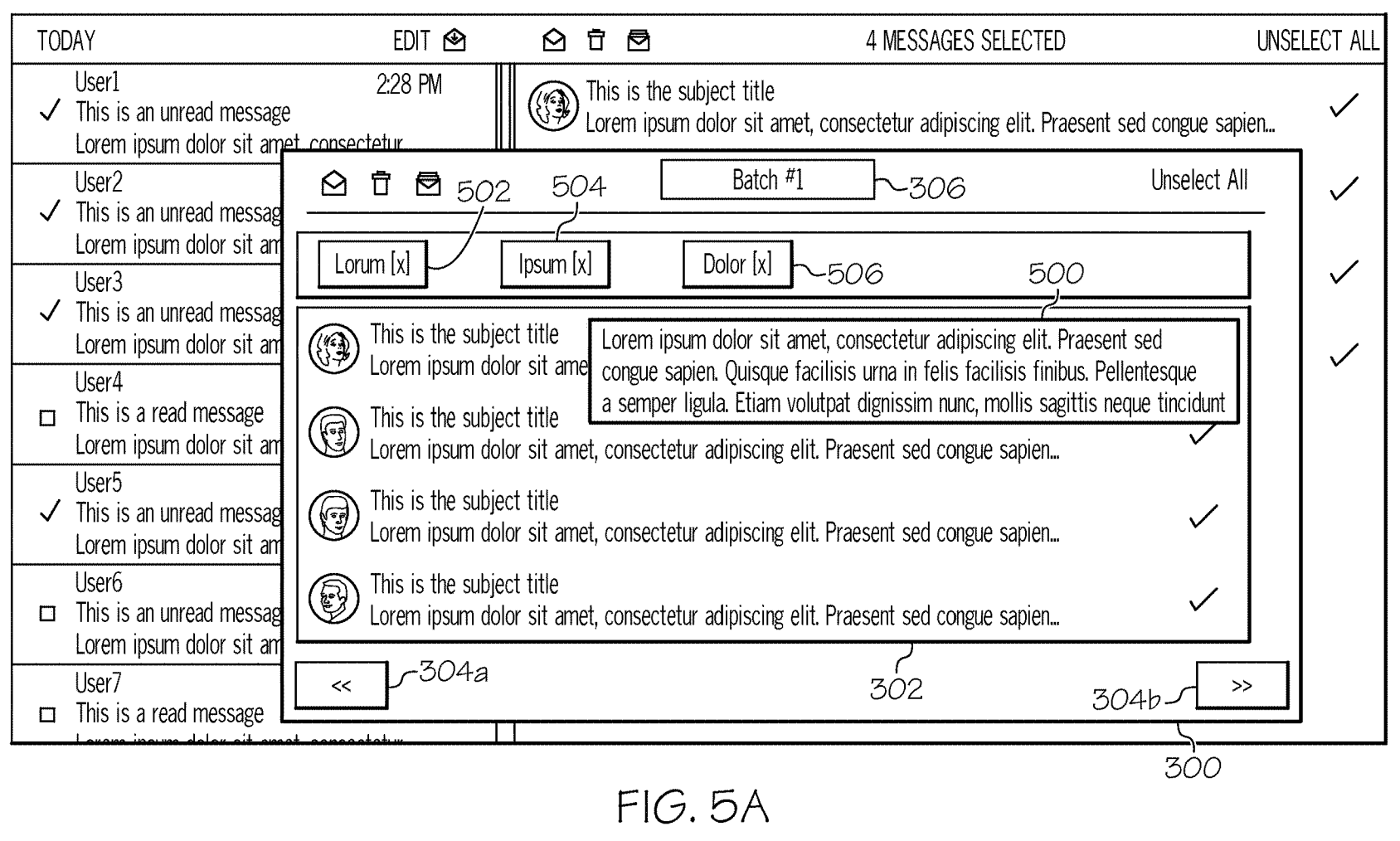
Figure 5B:
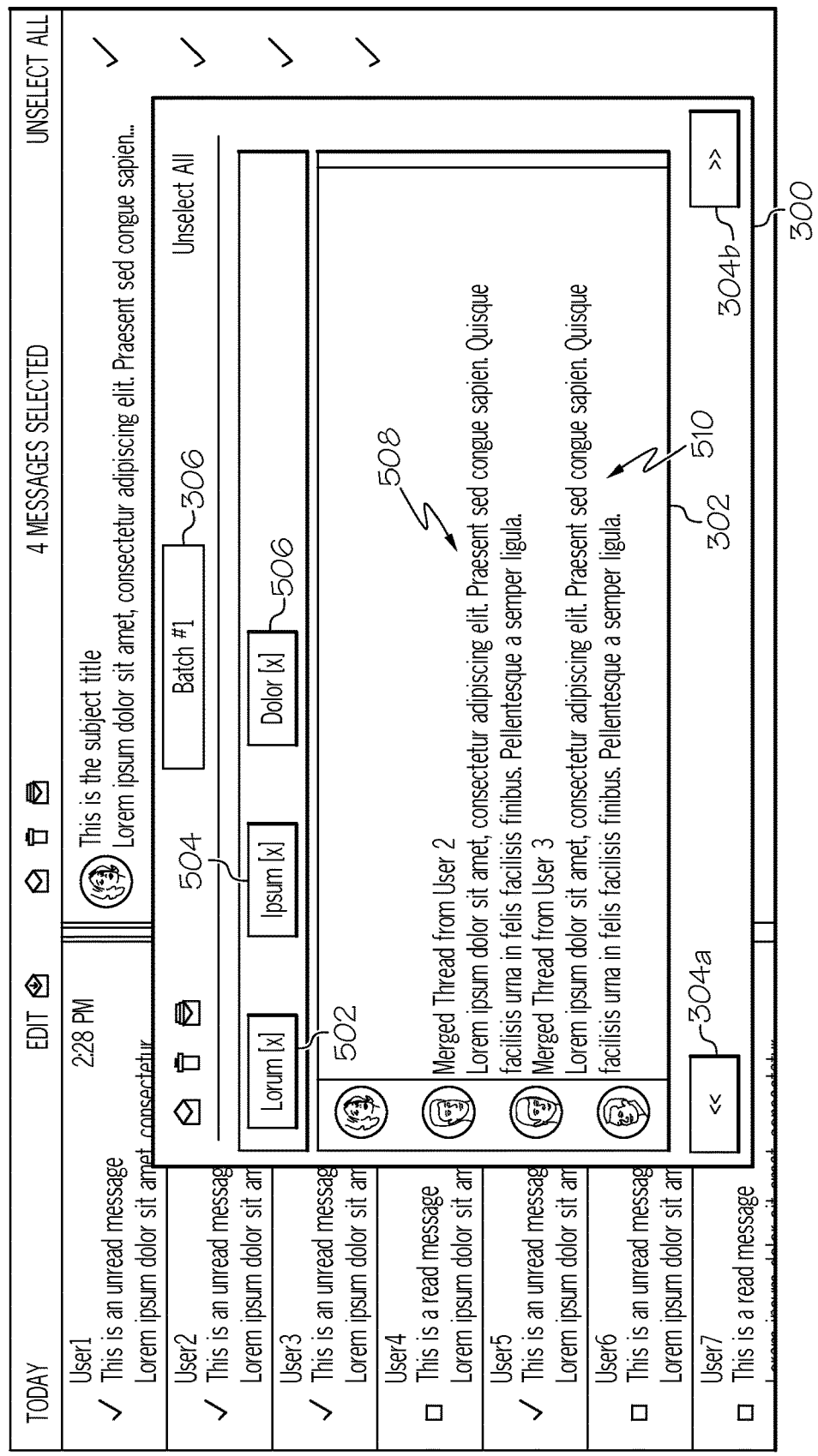

In block 402, messages for a particular or chosen batch may be selected. In block 404, information may be extracted from at least the TO, CC, and BCC address fields of the message. In block 406, content may be extracted from each thread of the batch. In block 406, a user may select a portion or portions of the content of each thread that the user may want to use for merging threads of different conversations. Referring also to FIGS. 5A and 5B, FIGS. 5A and 5B are an example of the batch interface 300 illustrating performance of the selected action of merging and selecting a subset of content from the messages grouped in the chosen batch 302 in the method 400 of FIG. 4. In FIG. 5A, a portion of content 500 may be selected by the user. In the example illustrated in FIG. 5A content related to "Lorum" 502, "Ipsum" 504, and "Dolor" 506 has been identified as being selected by the user for use in merging threads. The same content in other messages of the batch 302 may be selected.

In block 410, the selected portions of the content may be placed in collapsed sections of content 508 and 510 in the batch interface 300 as illustrated in FIG. 5B. The collapsed section of content 508 and 510 may define a new thread or conversation. Each collapsed section 508 and 510 may identify an origin or user from whom the merged thread was created. The collapsed sections 508 and 510 may be distinguished from one another, such by a different type or color or font. A reason or reasons why a particular message was selected for a certain batch may also be identified or highlighted to indicate to the user why the particular message is in the batch.

In block 412, all users from each of the message threads corresponding to the TO, CC, and BCC fields may be added to a draft new message or draft reply message as recipients.

In block 414, the collapsed sections of content 508 and 510 may be added to the new message or draft reply message, which may define a new thread. A personal message may also be added to the new message or draft reply message. In block 416, the new thread may be sent to the recipients.

Figure 6:
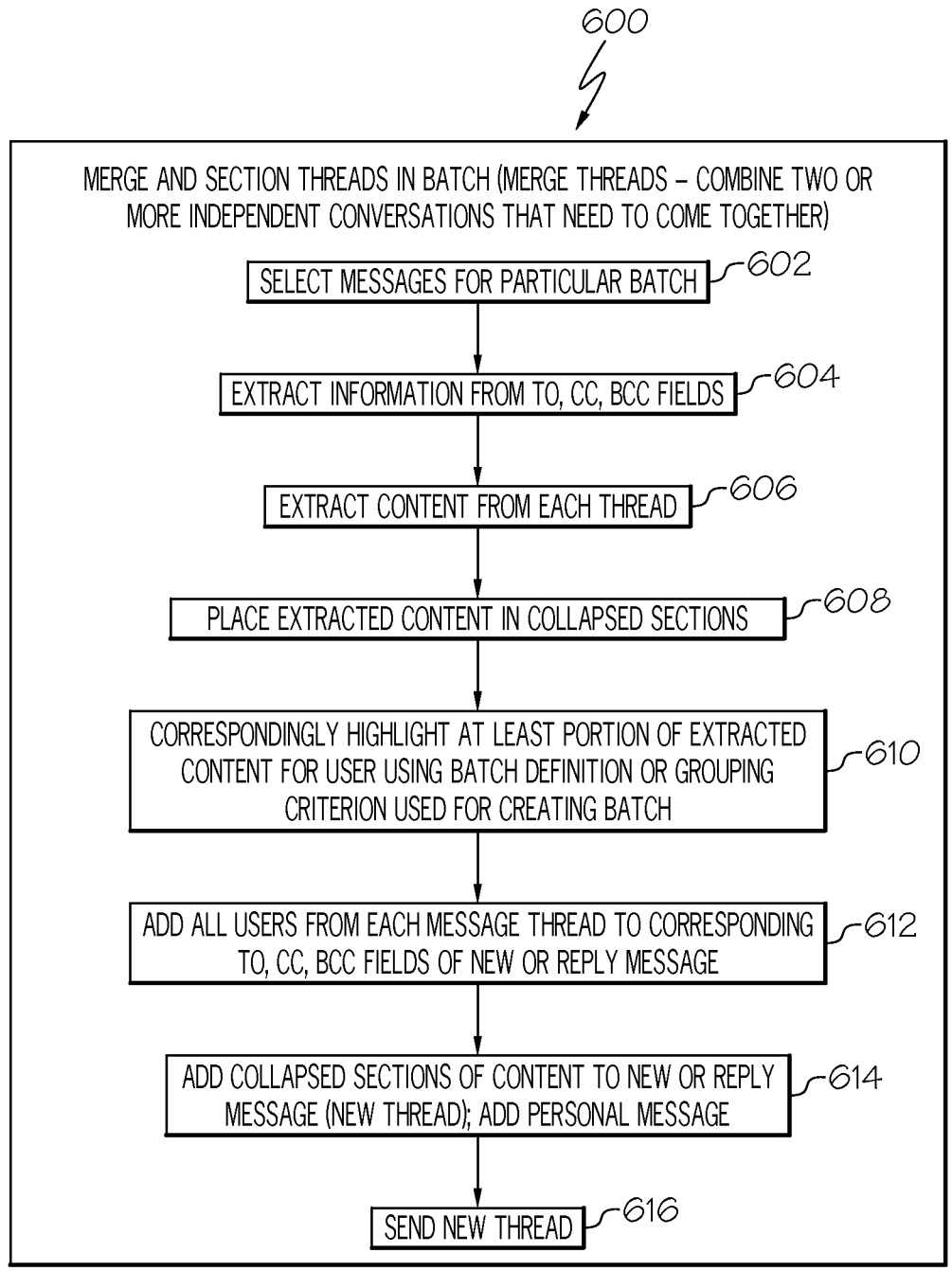
FIG. 6 is a flow chart of an example of a method for merging and sectioning threads in a chosen batch of messages in accordance with an embodiment of the present invention.

FIG. 6 is a flow chart of an example of a method 600 for merging and sectioning threads in a chosen batch of messages in accordance with an embodiment of the present invention. The method 600 may be implemented in response to selection of the action in the batch GUI 300 associated with block 140 in FIG. 1C. Merging and sectioning threads may involve combining two or more independent conversations that may be combinable or that may need to be combined for some reason or purpose.

In block 602, messages for a particular or chosen batch may be selected. In block 604, information may be extracted from at least the TO, CC, and BCC address fields of the message. In block 606, content may be extracted from each thread of the batch.

In block 608, the extracted content may be placed in collapsed sections of content. The collapsed sections may be similar to that shown and described with reference to FIG. 5B.

In the block 610, at least a portion of the extracted content may be correspondingly highlighted for the user using the batch definition or grouping criterion or criteria used for creating the batch.

In block 612, all users from each of the message threads corresponding to the TO, CC, and BCC fields may be added to a draft new message or draft reply message as recipients.

In block 614, the collapsed sections of content may be added to the new message or draft reply message, which may define a new thread. A personal message may also be added to the new message or draft reply message. In block 616, the new thread may be sent to the recipients.

Figure 7:
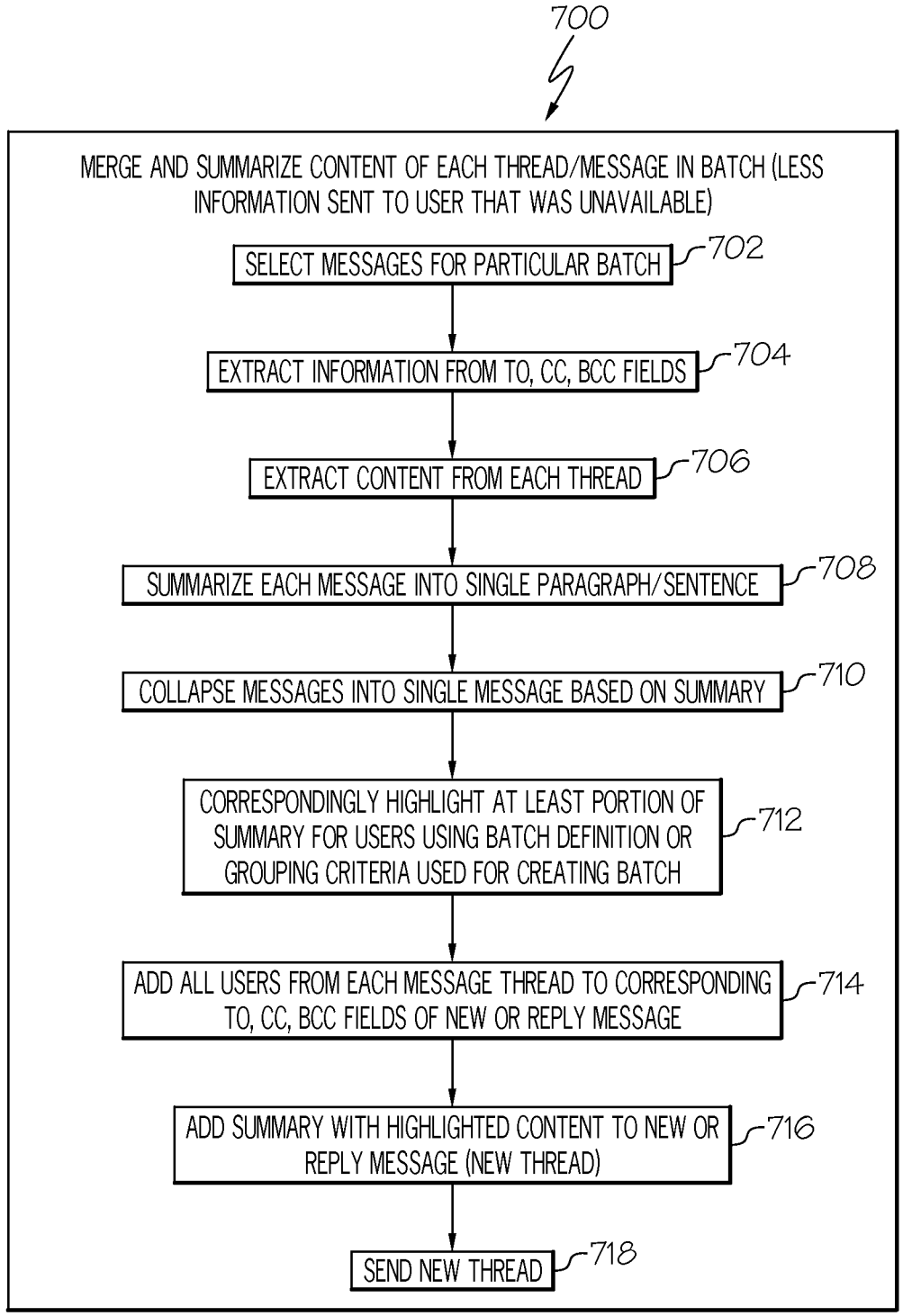
FIG. 7 is a flow chart of an example of a method for merging and summarizing content of each thread or message in a chosen batch of messages in accordance with another embodiment of the present invention.

FIG. 7 is a flow chart of an example of a method 700 for merging and summarizing content of each thread or message in a chosen batch of messages in accordance with an embodiment of the present invention. The method 700 may be implemented in response to selection of the action in the batch GUI 300 associated with block 142 in FIG. 1C. Merging and summarizing threads or messages may involve reducing the information sent to a user, such as a user that has been unavailable and may have an excessive number of messages and/or cluttered inbox.

In block 702, messages for a particular or chosen batch may be selected. In block 704, information may be extracted from at least the TO, CC, and BCC address fields of the message. In block 706, content may be extracted from each thread of the batch. In block 708, each message may be summarized in a single paragraph or sentence.

In block 710, the messages may be collapsed into a single message based on the summary. In the block 712, at least a portion of the summary may be correspondingly highlighted for the users or recipients of a new message or thread using the batch definition or grouping criterion used for creating the batch.

In block 714, all users from each of the message threads corresponding to the TO, CC, and BCC fields may be added to a draft new message or draft reply message as recipients.

In block 716, the summary with highlighted content may be added to the new message or draft reply message, which may define a new thread. A personal message may also be added to the new message or draft reply message. In block 718, the new thread may be sent to the recipients.

Figure 9:
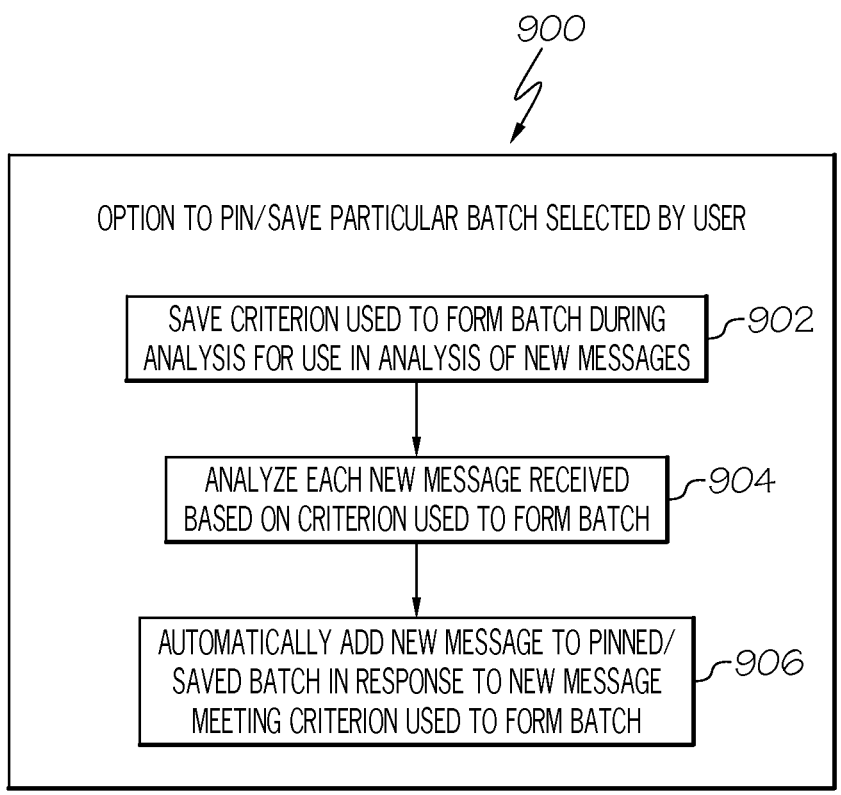
FIG. 9 is a flow chart of an example of a method for pinning and saving a selected batch in accordance with an embodiment of the present invention.

FIG. 9 is a flow chart of an example of a method 900 for pinning and saving a selected batch in accordance with an embodiment of the present invention. The method 900 may be implemented in response to selection of the action in the batch GUI 300 associated with block 154 in FIG. 1C. In block 902, the batch definition or grouping criterion or criteria used to form the batch during the analysis in block 108 (FIG. 1A) may be saved for use in analysis of new messages that are received by a communications device of a user.

In block 904, each new message received in an inbox of the user may be analyzed based on the batch definition or grouping criterion or criteria used to form or create the chosen batch to determine if the new message satisfies or meets the definition or grouping criterion or criteria.

In block 906, the new message may be automatically added to the pinned or saved batch in response to the new message meeting or satisfying the grouping criterion or criteria used to form or create the batch. Any saved and pinned batches may remain open and active and may classify any incoming messages as they are received by the communications device of the user based on the batch definition or grouping criterion. A batch may also be designated as a favorite batch so that the batch remains active and the batch definition or grouping criterion used to form the batch or group messages into the batch may be used to add newly received messages to the batch.

The different batches may be stored for moving from one device or browser session to the next.

A batch's underlying model or batch definition may be updated through a user dragging and dropping a selected message into a preferred batch, so that an online learning model may be updated.

The batches may be automatically formed and messages grouped into the different batches based on the analysis before a user logs in or activates the messaging system or application.

Figure 10:
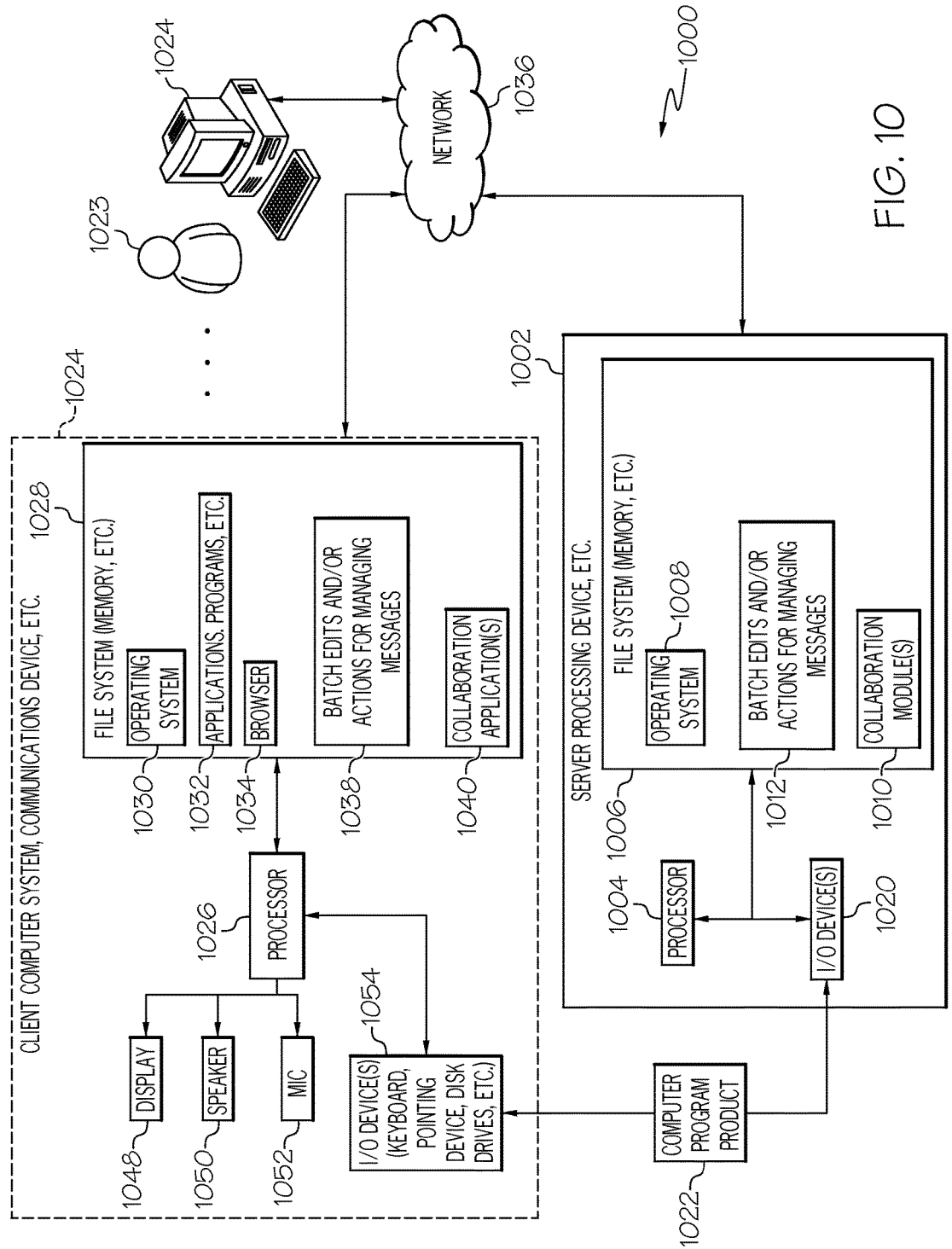
FIG. 10 is a block schematic diagram of an example of a system for managing messages using batch edits and/or actions in accordance with an embodiment of the present invention.

FIG. 10 is a block schematic diagram of an example of a system 1000 for managing messages using batch edits and/or actions in accordance with an embodiment of the present invention. The method 100 of FIGS. 1A-1C and methods 400, 600, 700 and 900 of FIGS. 4, 6, 7 and 9, respectively, may be embodied in and performed by the system 1000 and the exemplary GUIs described herein may be generated and presented by the system 1000. The system 1000 may include a processing device 1002. The processing device 1002 may be a server or similar processing device. The processing device 1002 may include a processor 1004 for controlling operation of the processing device 1002 and for performing functions, such as those described herein with respect to method 100 in FIGS. 1A-1C and methods 400, 600, 700 and 900 (FIGS. 4, 6, 7 and 9). The processing device 1002 may also include a file system 1006 or memory. An operating system 1008, applications and other programs may be stored on the file system 1006 for running or operating on the processor 1004. One or more collaboration modules 1010 or systems may also be stored on the file system 1006 and may be compiled and run on the processor 1004 to perform the functions or operations described herein. The collaboration module 1010 may be any type of online communications mechanism, networking arrangement or system for online or Internet communications or conversations, such as e-mail, instant messaging, chat or similar communications system or network.

A batch edits and/or actions module 1012 may also be stored on the file system 1006. The method 100 of FIGS. 1A-1C and methods 400, 600, 700 and 900 of FIGS. 4, 6, 7 and 9 may be embodied in the batch edits and/or actions module 1012 and performed by the processor 1004 when the batch edits and/or actions module 1012 is compiled and run on the processor 1004. The batch edits and/or actions module 1012 may operate in conjunction with the collaboration module 1010. The batch edits and/or actions module 1012 may be a separate component from the collaboration module 1010 or in another embodiment, the batch edits and/or actions module 1012 may be a component of the collaboration module 1010.

The processing device 1002 may also include one or more input devices, output devices or combination input/output devices, collectively I/O devices 1020. The I/O devices 1020 may include, but are not necessarily limited to, a keyboard or keypad, pointing device, such as a mouse, disk drive and any other devices to permit a user to interface with and control operation of the processing device 1002 and to access the collaboration module 1010 or system and the batch edits and/or actions module 1012. At least one of the I/O devices 1020 may be a device to read a computer program product, such as computer program product 1022. The computer program product 1022 may be similar to that described in more detail herein. The collaboration module 1010 and the batch edits and/or actions module 1012 may be loaded on the file system 1006 from a computer program product, such as computer program product 1022.

A member of a network, such as a social network, or user 1023 of the system 1000 may use a computer system 1024 or communications device to access the processing device 1002 or server and collaboration module 1010 and batch edits and/or actions module 1012. The computer system 1024 or communications device may be any sort of communications device including a mobile or handheld computer or communications device. The computer system 1024 may include a processor 1026 to control operation of the computer system 1024 and a file system 1028, memory or similar data storage device. An operating system 1030, applications 1032 and other programs may be stored on the file system 1028 for running or operating on the processor 1026. A web or Internet browser 1034 may also be stored on the file system 1028 for accessing the processing device 1002 or server via a network 1036. The network 1036 may be the Internet, an intranet or other private or proprietary network.

A batch edits and/or actions application 1038 may also be stored on the file system 1028. The method 100 in FIGS. 1A-1C or at least portions of the method 100 and methods 400, 600, 700 and 900 of FIGS. 4, 6, 7 and 9, respectively, or at least portions of these methods may be embodied in and performed by the batch edits and/or actions application 1038. The batch edits and/or actions application 1038 may be compiled and run on the processor 1026 to perform functions similar to those described with respect to methods 100, 400, 600, 700 and 900.

One or more collaboration applications 1040 may also be stored on the file system 1028. The one or more collaboration applications 1040 may be any type of online communications mechanism for online communications or conversations. The batch edits and/or actions application 1038 may be a separate component from the collaboration application 1040 as shown in the exemplary embodiment in FIG. 10, or in another embodiment, the batch edits and/or actions application 1038 be a component of the collaboration application 1040.

The collaboration application 1040 and the batch edits and/or actions application 1038 operating on the computer system 1024 may interface with or operate in conjunction with the collaboration module 1010 and the batch edits and/or actions module 1012 on the processing device 1002 or server to perform the functions and operations described herein. Accordingly, collaboration application 1040 and batch edits and/or actions application 1038 operating on the computer system 1024 may perform some of the functions and operations of the method 100 and methods 400, 600, 700 and 900 and collaboration module 1010 and batch edits and/or actions module 1012 operating on the processing device 1002 or server may perform other functions of the method 100 and methods 400, 600, 700 and 900. Some embodiments of the present invention may include only the collaboration module 1010 and batch edits and/or actions module 1012 on the processing device 1002 or server, and other embodiments may include only the collaboration application 1040 and batch edits and/or actions application 1038 operating on the client computer system 1024 or communications device.

The client computer system 1024 or communications device may also include a display 1048, a speaker system 1050, and a microphone 1052 for voice communications. Commands may be presented on the display 1048 for controlling operation of the collaboration module 1010 and batch edits and/or actions module 1012 and/or batch edits and/or actions application 1038 and collaboration application 1040 and for performing the operations and functions described herein. The exemplary GUIs 200 in FIG. 2, 300 in FIGS. 3A-3B and 5A-5B, and 800 in FIG. 8 may be presented on the display 1048.

The computer system 1024 may also include one or more input devices, output devices or combination input/output devices, collectively I/O devices 1054. The I/O devices 1054 may include a keyboard or keypad, pointing device, such as a mouse, disk drives and any other devices to permit a user, such as user 1023, to interface with and control operation of the computer system 1024 and to access the collaboration application 1040 and collaboration module or system 1010 on server 1002. The I/O devices 1054 may also include at least one device configured to read computer code from a computer program product, such as computer program product 1022.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for managing messages, comprising:
   detecting, by a processor, a need to manage a multiplicity of messages in an inbox of a single user based on one of a predetermined criterion or a preset trigger or action, the need to manage the multiplicity of messages comprises at least one of a number of unread message exceeding a first preset threshold, a number of selected messages exceeding a second preset threshold, a depth of a thread of messages in a conversation exceeding a third preset threshold, a number of conversation threads exceeding a fourth preset threshold, an expected time to review a plurality of messages in the inbox of the user exceeding a fifth preset threshold, and a preset window of time being exceeded;
   analyzing, by the processor, a set of components of each message;
   creating, by the processor, a plurality of batches of messages from the multiplicity of messages in response to detecting the need to manage the multiplicity of messages in the inbox of the user, wherein each batch is based on the analysis of the set of components of each message and wherein creating the plurality of batches of messages comprises physically grouping each of the messages into one of the batches based on the analysis of the set of components of each message, that allows the messages in a particular batch to be processed together or batch processed reducing processing time, each batch corresponding to a commonality or relatedness between the messages grouped in each batch; and
   performing, by the processor, a selected action on a chosen batch of messages, wherein performing the selected action comprises at least merging messages in the chosen batch of messages to reduce the processing time.

2. The method of claim 1, wherein creating the plurality of batches of messages comprises:
   determining the commonality or relatedness of the set of components between the multiplicity of messages based on the analysis of the set of components; and
   grouping the messages into the batches based on the commonality or relatedness of the set of components between the messages.

3. The method of claim 2, wherein determining a commonality or relatedness of the set of components between the multiplicity of messages comprises matching components between the multiplicity of messages based on a certain confidence level.

4. The method of claim 1, wherein analyzing the set of components of each message comprises at least one of:
   determining a commonality or relatedness of subjects of each of the messages;
   determining a commonality of identity of persons associated with each of the messages;
   determining a commonality or relatedness of content of each of the messages;
   extracting signatures of a sender and/or prior signatures in a thread;
   determining a commonality or relatedness of mime-data fields of each of the messages; and
   determining a social distance between a sender and recipients of each of the messages.

5. The method of claim 4, further comprising applying a weight to each analysis based on a predetermined criterion.

6. The method of claim 5, wherein applying the weight to each analysis based on the predetermined criterion comprises applying a weight to each analysis based on the component of each message being analyzed.

7. The method of claim 5, wherein creating the plurality of batches of messages further comprises grouping each message into one of the batches based the analysis of the set of components of each message and the weight applied to each analysis.

8. The method of claim 5, further comprising defining a grouping criterion for grouping each message into one of the batches for each of the plurality of batches of messages, the grouping criterion corresponding to the analysis of the set of components of each message and the weight applied to the analysis of each component.

9. The method of claim 8, further comprising:
   saving the grouping criterion for at least one selected batch;
   analyzing each new message received by a communications device of the user based on the grouping criterion for the one selected batch; and
   adding the new message to the one selected batch in response to the new message meeting the grouping criterion for the one selected batch.

10. The method of claim 1, further comprising:
    presenting the batches to the user in a user interface;
    presenting a plurality of actions in the user interface for selection by the user for performance on a chosen batch of messages;
    performing the selected action on the chosen batch of messages in response to selection by the user, wherein performing the selected action on the chosen batch of messages comprises at least one of:
    merging the messages and sectioning each thread of a plurality of threads of the chosen batch;
    merging the messages and providing a summarization of the messages for the chosen batch;

merging the messages and selecting a subset of content of a particular thread of the chosen batch;
replying to each message in the chosen batch;
replying to each member or user identified in the chosen batch;
merging the messages of the chosen batch into a separate collaborative artifact for the chosen batch; and
relocating the messages of the chosen batch to a particular folder for the chosen batch.

11. The method of claim 1, wherein merging the messages and sectioning each thread of the chosen batch comprises:
selecting a set of messages for the chosen batch;
extracting information from TO, CC and BCC fields of each message of the set of messages;
extracting content from each thread of the chosen batch;
highlighting at least a portion of extracted content based on criterion for creating the chosen batch;
automatically generating a reply message, wherein automatically generating the reply message comprises:
automatically adding all users from each message thread to the reply message;
automatically adding the extracted content including the highlighting of at least the portion of the extracted content; and
automatically sending the reply message.

12. The method of claim 1, wherein performing the selected action on the chosen batch of messages comprises taking an action on each message of the chosen batch or taking an action on each thread of messages of the chosen batch.

13. A system for managing messages, comprising:
a processor;
a memory associated with the processor;
a module stored on the memory and operable on the processor for managing messages, the module being configured to cause the processor to perform a set of functions comprising:
detecting a need to manage a multiplicity of messages in an inbox of a single user based on one of a predetermined criterion or a preset trigger or action, the need to manage the multiplicity of messages comprises at least one of a number of unread message exceeding a first preset threshold, a number of selected messages exceeding a second preset threshold, a depth of a thread of messages in a conversation exceeding a third preset threshold, a number of conversation threads exceeding a fourth preset threshold, an expected time to review a plurality of messages in the inbox of the user exceeding a fifth preset threshold, and a preset window of time being exceeded;
analyzing a set of components of each message;
creating a plurality of batches of messages from the multiplicity of messages in response to detecting the need to manage the multiplicity of messages in the inbox of the user, wherein each batch is based on the analysis of the set of components of each message and wherein creating the plurality of batches of messages comprises physically grouping each of the messages into one of the batches based on the analysis of the set of components of each message, that allows the messages in a particular batch to be processed together or batch processed reducing processing time, each batch corresponding to a commonality or relatedness between the messages grouped in each batch; and
performing a selected action on a chosen batch of messages, wherein performing the selected action comprises at least merging messages in the chosen batch of messages to reduce the processing time.

14. The system of claim 13, wherein creating the plurality of batches of messages comprises:
determining the commonality or relatedness of the set of components between the multiplicity of messages based on the analysis of the set of components; and
grouping the messages into the batches based on the commonality or relatedness of the set of components between the messages.

15. The system of claim 13, wherein the set of functions further comprises:
presenting the batches to the user in a user interface;
presenting a plurality of actions in the user interface for selection by the user for performance on a chosen batch of messages;
performing the selected action on the chosen batch of messages in response to selection by the user, wherein performing the selected action on the chosen batch of messages comprises at least one of:
merging the messages and sectioning each thread of a plurality of threads of the chosen batch;
merging the messages and providing a summarization of the messages for the chosen batch;
merging the messages and selecting a subset of content of a particular thread of the chosen batch;
replying to each message in the chosen batch;
replying to each member or user identified in the chosen batch;
merging the messages of the chosen batch into a separate collaborative artifact for the chosen batch; and
relocating the messages of the chosen batch to a particular folder for the chosen batch.

16. A computer program product for managing messages, the computer program product comprising a computer readable storage medium having program instructions embodied therewith, wherein the computer readable storage medium is not a transitory medium per se, the program instructions being executable by a device to cause the device to perform a method comprising:
detecting a need to manage a multiplicity of messages in an inbox of a single user based on one of a predetermined criterion or a preset trigger or action, the need to manage the multiplicity of messages comprises at least one of a number of unread message exceeding a first preset threshold, a number of selected messages exceeding a second preset threshold, a depth of a thread of messages in a conversation exceeding a third preset threshold, a number of conversation threads exceeding a fourth preset threshold, an expected time to review a plurality of messages in the inbox of the user exceeding a fifth preset threshold, and a preset window of time being exceeded;
analyzing a set of components of each message;
creating a plurality of batches of messages from the multiplicity of messages in response to detecting the need to manage the multiplicity of messages in the inbox of the user, wherein each batch is based on the analysis of the set of components of each message and wherein creating the plurality of batches of messages comprises physically grouping each of the messages into one of the batches based on the analysis of the set of components of each message, that allows the messages in a particular batch to be processed together or batch processed reducing processing time, each batch corresponding to a commonality or relatedness between the messages grouped in each batch; and performing a selected action on a chosen batch of messages, wherein performing the selected action comprises at least merging messages in the chosen batch of messages to reduce the processing time.

17. The method of claim 1, further comprising automatically grouping the messages into one of the batches of messages before the user logs in or activates a messaging system or application.

\* \* \* \* \*